(12) United States Patent
Blivet

(10) Patent No.: US 6,520,212 B1
(45) Date of Patent: Feb. 18, 2003

(54) PROTECTIVE END CAP FOR TUBE END

(75) Inventor: Philippe Blivet, Rennes (FR)

(73) Assignee: Legris S.A., Rennes (FR)

( * ) Notice: Subject to any disclaimer, the term of this patent is extended or adjusted under 35 U.S.C. 154(b) by 0 days.

(21) Appl. No.: 10/048,418

(22) PCT Filed: Jul. 3, 2000

(86) PCT No.: PCT/FR00/01883
§ 371 (c)(1),
(2), (4) Date: Jan. 30, 2002

(87) PCT Pub. No.: WO01/09546
PCT Pub. Date: Feb. 8, 2001

(30) Foreign Application Priority Data

Jul. 30, 1999 (FR) .............................. 99 09951

(51) Int. Cl.[7] .............................. B65D 59/00
(52) U.S. Cl. ..................... 138/96 R; 138/89; 285/4; 215/251; 215/253
(58) Field of Search ................ 138/89, 96 R; 283/4; 220/266; 215/250, 251, 253

(56) References Cited

U.S. PATENT DOCUMENTS 4,632,267 A * 12/1986 Fowles et al. .............. 215/253
4,899,903 A * 2/1990 Miyasaka et al. ............. 138/89
4,903,855 A * 2/1990 Ducay et al. ................ 215/249
5,520,219 A * 5/1996 Hessian ....................... 138/90

FOREIGN PATENT DOCUMENTS

| GB | 2 028 949 | 3/1980 |
| GB | 2 031 858 | 4/1980 |
| GB | 2 321 041 | 7/1998 |

* cited by examiner

Primary Examiner—Patrick Brinson
(74) Attorney, Agent, or Firm—Young & Thompson

(57) ABSTRACT

A protective endpiece for the end of a tube (100), the endpiece comprises a sheath (2) about an axis (3) possessing a central housing (4) for receiving the end of the tube (100) and has an open end (5) and a closed end (6). The sheath is provided at its open end (5) with a ring (10) that is detachable from the sheath so that after the sheath (2) has been removed and the end of the tube (100) has been coupled to a piece of equipment (200), the ring forms a stopper on,the end of the tube (100) for closing the gap that exists between the end of the tube (100) and the equipment (200).

5 Claims, 2 Drawing Sheets

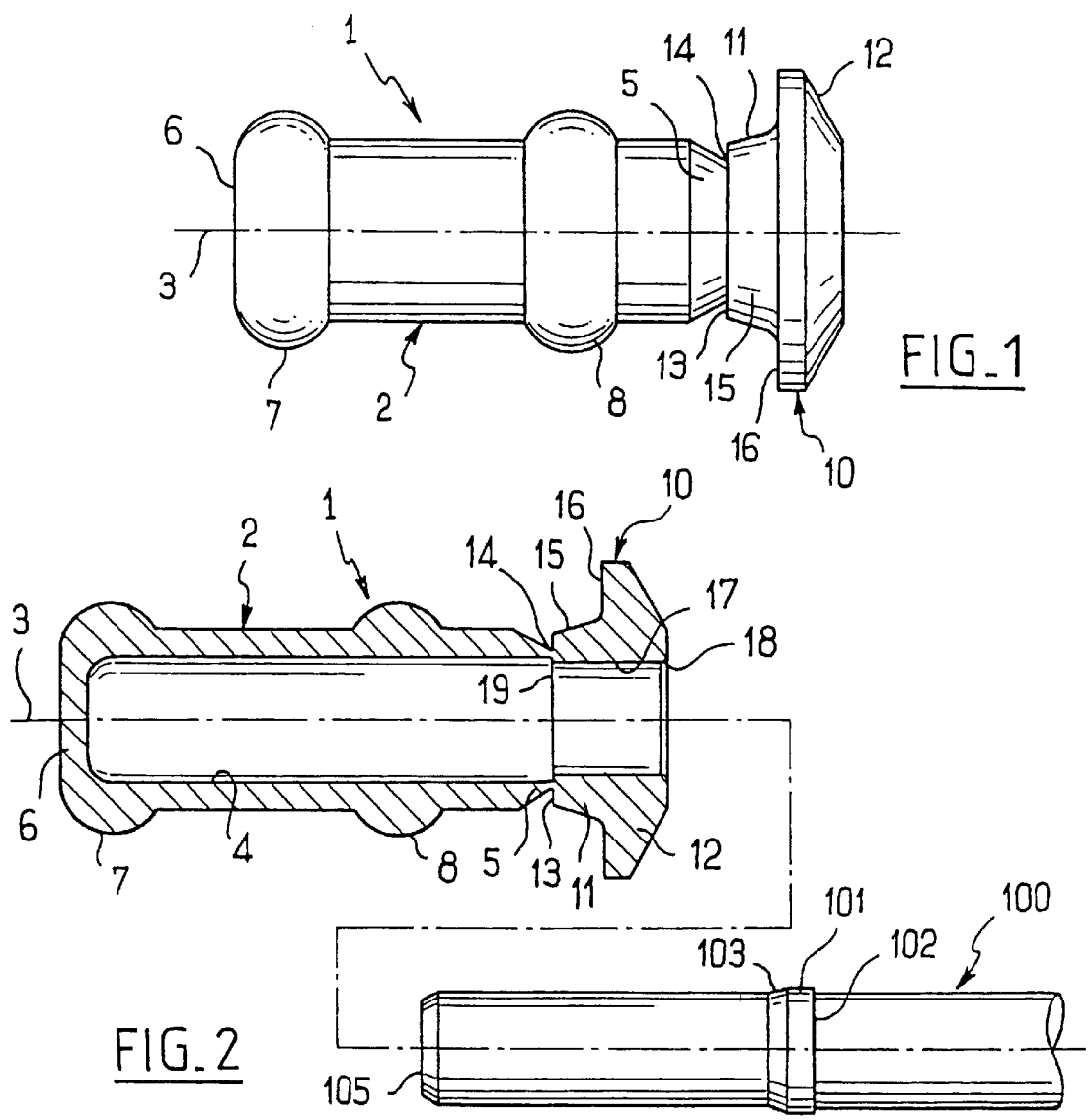
FIG_1
FIG_2
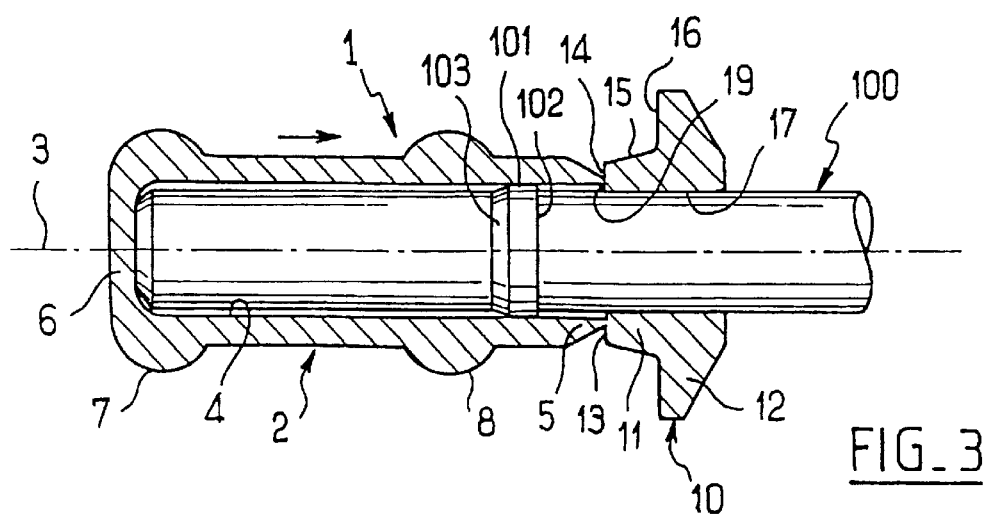
FIG_3

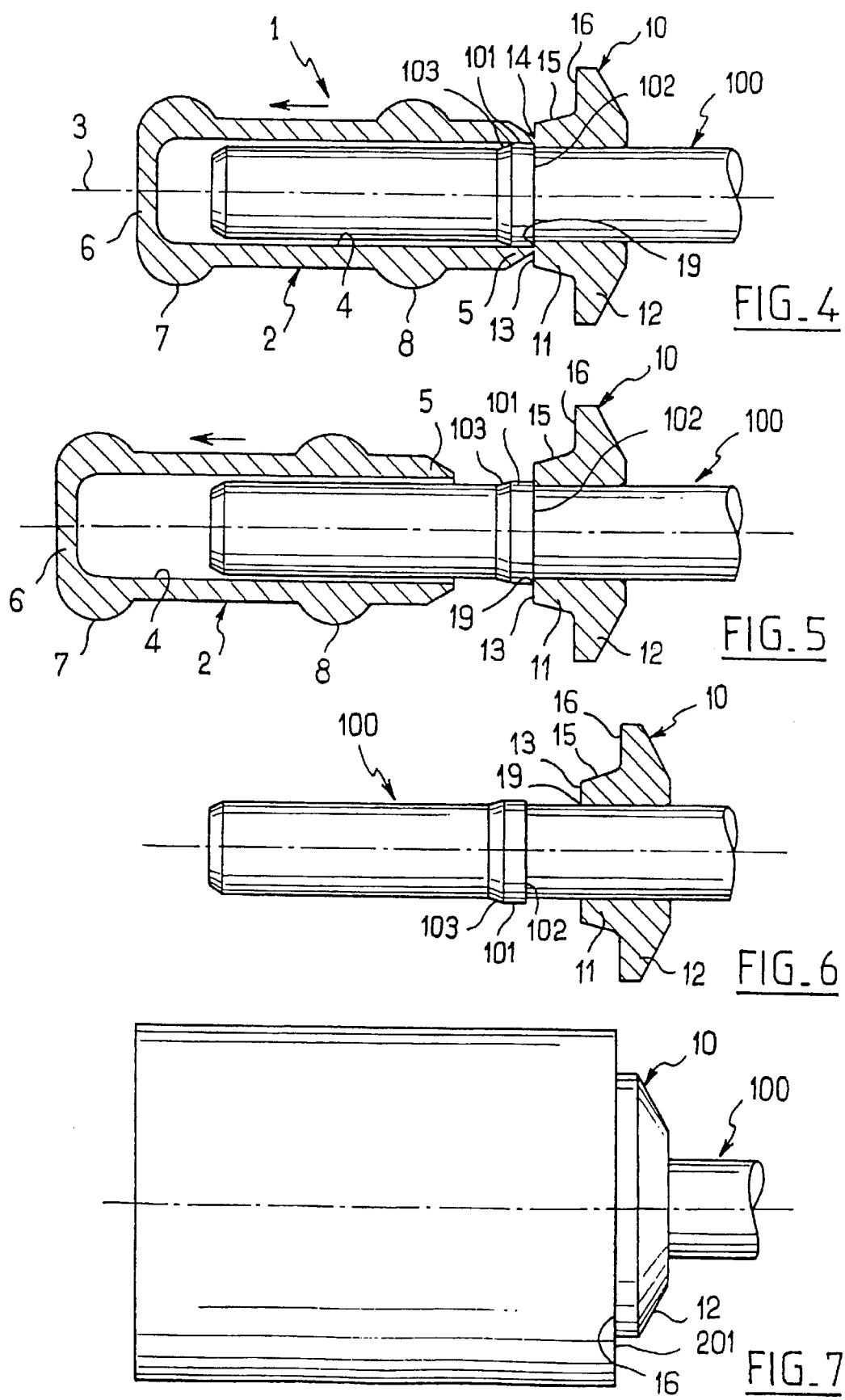

PROTECTIVE END CAP FOR TUBE END

The present invention relates to a protective endpiece for the end of a tube.

BACKGROUND OF THE INVENTION

Protective endpieces for the ends of tubes are known that are in the form of a sheath about an axis, presenting a central housing for receiving the end of a tube, one end of the housing being open and the other end closed.

Such endpieces are commonly mounted on the ends of tubes in order to protect them during storage, transport, and handling, and prior to connection with a piece of equipment such as the body of a pneumatic or hydraulic component.

OBJECT AND SUMMARY OF THE INVENTION

The invention provides a protective endpiece for the end of a tube, the endpiece comprising a sheath about an axis possessing a central housing for receiving the end of the tube and having an open end and a closed end, in which endpiece the sheath is provided at its open end with a ring that is detachable from the sheath so that after the sheath has been removed and the end of the tube has been coupled to a piece of equipment, the ring forms a stopper on the end of the tube for closing the gap that exists between the end of the tube and the equipment.

Thus, prior to the tube end being coupled to the equipment, the endpiece performs its conventional function of protecting the end of the tube. When it is time to couple the end of the tube to the equipment in question, the ring is detached from the sheath and remains on the end of the tube, while the sheath is withdrawn to uncover the end of the tube and to enable it to be coupled to the equipment. Once this coupling has been achieved, the ring which remains in place on the end of the tube is pressed against the equipment so as to prevent impurities from penetrating therein via the gap which exists between the equipment and the end of the tube. In this state, the ring performs a closure member or "dust-excluder" function for the coupling between the end of the tube and the equipment.

In an advantageous embodiment, the detachable ring is made integrally with the sheath, a breakable zone having weak mechanical characteristics being provided at the junction between the ring and the sheath to enable said ring to be separated manually.

According to an advantageous characteristic of the invention, the detachable ring presents an inside shoulder arranged to co-operate with a corresponding shoulder on the end of the tube to retain the detachable ring on the end of the tube when an axial force is exerted on the sheath to withdraw it. The ring is thus itself held on the end of the tube and it becomes automatically detached from the sheath when sufficient axial force is exerted thereon to remove it.

It is then advantageous for the detachable ring to present an inside diameter which is slightly smaller than the inside diameter of the sheath, the retaining shoulder of the detachable ring being provided at the junction between said ring and the sheath.

According to another advantageous characteristic of the invention, the detachable ring comprises a body adjacent to the sheath and designed to be received between the end of the tube and the equipment, and a shoulder for pressing against the equipment. This provides closure that is particularly efficient and convenient. It suffices merely to dimension the body of the ring in such a manner that it is inserted with a certain amount of tightness between the equipment and the end of the tube. The resulting clamping then holds the ring in its stopper position against the equipment without any need for other locking members, and also reinforces the effectiveness of closure.

In which case, it is advantageous for the body of the detachable ring to present an outside surface that is frusto-conical. The conical shape of the ring body makes it easier to insert the body into the equipment while simultaneously obtaining good clamping.

BRIEF DESCRIPTION OF THE DRAWINGS

Other characteristics and advantages of the invention will appear on reading the following description of a particular embodiment given by way of non-limiting example.

Reference is made to the accompanying drawings, in which:

FIG. 1 is a side view of a protective endpiece of the invention;

FIG. 2 is an axial section view of the FIG. 1 endpiece, ready for fitting onto a tube end;

FIG. 3 is a view analogous to FIG. 2, after the endpiece has been fitted on the tube end so as to protect it;

FIG. 4 is a view analogous to FIG. 3, an axial force being exerted on the sheath and the inside shoulder of the detachable ring coming into abutment against the corresponding shoulder at the end of the tube;

FIG. 5 is a view analogous to FIG. 4 with the ring being detached from the sheath after the connection between them has broken under the effect of the axial removal force;

FIG. 6 is a view analogous to FIG. 5, the sheath being removed from the end of the tube while the detached ring remains thereon alone; and FIG. 7 is a side view of the end of the tube connected to a piece of equipment, the detached ring of the endpiece then performing its function as a closure member or "dust-excluder" between the end of the tube and the equipment.

DETAILED DESCRIPTION OF THE INVENTION

With reference to the figures, and in particular with reference to FIGS. 1 and 2, an endpiece 1 of the invention is used to protect the end of a tube 100.

This endpiece comprises a sheath 2 about an axis 3 and possessing a cylindrical central housing 4 with an open end 5 situated to the right in the figures and a closed end 6 situated to the left. On the outside, the sheath 2 also has two annular projections 7, 8 to make it easier to grip in order to enable it to be pulled along the axis 3, as explained below.

At its open end 5, the sheath 2 is provided with a ring 10 which is detachable. Specifically, the ring 10 comprises a body 11 having a peripheral outside surface in the form of a truncated cone whose apex is directed towards the sheath, and a shoulder 12 situated to the right of the body 11, i.e. at a distance from the sheath 2, and presenting a bearing face 16 perpendicular to the axis 3 and facing the sheath 2. The body 11 of the ring 10 also possesses a left-hand edge 13 which is connected to the front end 5 of the sheath 2.

In this case, the detachable ring 10 is formed integrally with the sheath 2. A breakable zone 14 is provided by means of a peripheral groove where the left-hand edge 13 of the ring 10 meets the front end 5 of the sheath 2. Because of its reduced thickness, this breakable zone 14 is mechanically weakened sufficiently to enable the ring to be separated from the sheath 2 manually by breaking said zone by exerting an axial traction force on the sheath 2, as explained below.

Finally, the ring 10 presents a cylindrical inside surface about the axis 3 of diameter that is slightly greater than the diameter of the central housing 4 of the sheath 2 and substantially equal to the outside diameter of the tube 100. At its right-hand end, this inside surface 17 of the ring 10 presents a chamfer 18.

The reduction in diameter between the cylindrical housing 4 of the sheath 2 and the cylindrical inside surface 17 of the ring 10 gives rise to a shoulder 19 whose surface facing the sheath 2 is situated in this case in the same plane perpendicular to the axis 3 as the left-hand edge 13 of the body 11 of the ring 10.

The endpiece is shipped in the configuration shown in FIGS. 1 and 2 and as described above, and it is used as follows.

The first function of the endpiece is to protect the end of the tube 100. As mentioned above, the tube 100 has an outside diameter which is substantially equal to the diameter of the inside surface 17 of the ring 10. The tube 100 also possesses a shoulder 101 which is situated at a certain distance from its free end 105 and, with reference to the figures, it presents a left-hand surface 103 forming a conical ramp, and a right-hand surface 102 situated in a plane that is substantially perpendicular to the axis of the tube 100.

As shown in FIG. 3, the endpiece 1 is fitted onto the end of the tube 100 whose axis then coincides with the axis 3 of the endpiece. The end of the tube 100 is thus pushed into the housing 4 of the sheath 2 until the free end 105 of the tube comes into abutment against the closed end 6 of the sheath. Before reaching this configuration in which the endpiece 1 is fully engaged on the end of the tube 100, as shown in FIG. 3, the shoulder 101 must go past the ring 10 such that the face 102 of the shoulder 101 is situated to the left of the inside shoulder 19 situated at the junction between the ring 10 and the sheath 2. In this respect, the conical shape of the left-hand face 103 of the shoulder 101 of the tube 100 makes it easier to pass the shoulder 101 through the ring 10 in spite of the diameter of the shoulder 101 being slightly greater than the diameter of the inside surface 17 of said ring.

In this configuration, the endpiece 1 performs its conventional protection function on the end of the tube 100. It will be observed that in the event of the endpiece 1 tending to slip off the end of the tube 100 to the left, i.e. tending to become separated therefrom, as shown in FIG. 4, then the inside shoulder 19 provided at the junction between the ring 10 and the sheath 2 comes into abutment against the left-hand face 102 of the shoulder 101 at the end of the tube 100 so that the endpiece 1 is retained on the tube 100. This prevents the end of the tube 100 losing the protection provided by the endpiece 1 in untimely manner, e.g. while being handled or in transit.

When the end of the tube 100 is to be coupled to a piece of equipment 200 (shown only in FIG. 7), then the end of the tube 100 is initially extracted from the sheath 2. For this purpose, and as shown in FIGS. 4 and 5, traction force is exerted on the sheath 2 along the axis 3 towards the left. This traction force seeking to remove the sheath 2 axially is exerted manually, and the user's grip on the sheath 2 is made easier and more reliable by the presence of the two annular projections 7, 8 on the outside surface of the sheath 2. However, the ring 10 is retained by the internal shoulder 19 coming into abutment against the right-hand face 102 of the shoulder 101 at the end of the tube 100. Once the magnitude of the withdrawal force becomes sufficient, the breakable zone 14 provided at the junction between the ring 10 and the sheath 2 breaks, so the ring 10 becomes separated from the sheath.

The sheath 2 can then be withdrawn from the end of the tube 100 so as to leave it disengaged, as shown in FIG. 6. Nevertheless, it will be understood that in this configuration, the ring 10, now separated from the sheath 2, remains in place on the end of the tube 100, as can be seen in FIG. 6.

The end of the tube 100 can then be coupled to a piece of equipment such as that represented diagrammatically at 200 in FIG. 7. Coupling is by means of a conventional coupling device which does not constitute the subject matter of the present invention and which is therefore not described further.

Once this coupling has been achieved, the ring 10 which is still in place on the end of the tube 100 is pressed against the equipment 200 to form a closure member or "dust-excluder" preventing impurities from penetrating into the gap that remains between the equipment 200 and the end of the tube 100. More precisely, the body 11 of the ring 10 is pushed like a cork into the gap that remains between the equipment 200 and the end of the tube 100 and it is inserted tightly into this gap, with insertion and tightening inside the equipment 200 being made easier and more reliable by the peripheral surface 15 of the body 11 of the ring 10 being conical. The closure and protection of the gap that exists between the equipment 200 and the end of the tube 100 are finished off by the shoulder of the ring 10 being pressed like a washer or a cap against the equipment 200, the face 16 of said shoulder coming into abutment against a corresponding face 201 of the equipment 200.

The invention is not limited to the embodiment described above, but on the contrary covers any variant using equivalent means to reproduce the essential characteristics of the invention.

In particular, although the detachable ring in the above-described example is formed integrally with the sheath, it would be equally possible to make an endpiece of the invention in which the detachable ring is made initially as a piece that is separate from the sheath. Under such circumstances, temporary breakable connection means are provided to secure the ring 10 temporarily to the sheath 1 until an axial force tending to separate the ring from the sheath causes the connection means to give way so as to enable the ring to be separated from the sheath. By way of example, an assembly could be provided using a tight-fit and/or snap-fastening engagement, adhesive, or any other fixing means presenting a weak or breakable zone.

In addition, although the detachable ring is provided in the above-shown example with an inside shoulder situated in the same plane as its own left-hand edge (relative to the drawings), it is equally possible to provide a detachable ring which is provided with an inside shoulder that is set further back, i.e. further towards the right (with reference to the figures) than its left-hand edge, the essential point being that said shoulder must be capable of co-operating with a corresponding face of a shoulder at the end of the tube.

Although this inside shoulder is advantageous insofar as it enables the detachable ring to be retained automatically on the end of the tube, it is nevertheless not essential. An endpiece of the invention could be made having a detachable ring that does not have any inside shoulder suitable for holding it on the end of the tube. For example, the inside surface of the ring (reference 17 in the figures) could extend in line with the surface of the central housing of the sheath (reference 4 in the figures). It would then suffice for detaching the ring from the sheath to exert opposing axial forces on the ring and on the sheath, or indeed twisting forces, seeking to separate them. For this purpose, it is possible to make use of the grip made available by the shoulder 12 of the ring.

What is claimed is:

1. A protective endpiece for the end of a tube (100), the endpiece comprising:

a sheath (2) about an axis (3) possessing a central housing (4) for receiving the end of the tube (100) and having an open end (5) and a closed end (6), wherein the sheath is provided at its open end (5) with a ring (10) that is detachable from the sheath, wherein said ring comprises a body (11) adjacent to said sheath and a shoulder (12) spaced from said sheath so that after the sheath (2) has been removed and the end of the tube (100) has been coupled to a piece of equipment (200), the ring forms a stopper on the end of the tube (100) with said body (11) for closing the gap that exists between the end of the tube (100) and the equipment (200).

2. A protecting endpiece according to claim 1, wherein the detachable ring (10) is made integrally with the sheath (2), a breakable zone (14) having weak mechanical characteristics being provided at the junction between the ring (10) and the sheath (2) to enable said ring to be separated manually.

3. A protective endpiece according to claim 1, wherein the detachable ring (10) presents an inside shoulder (19) arranged to co-operate with a corresponding shoulder (102) on the end of the tube (100) to retain the detachable ring (10) on the end of the tube (100) when an axial force is exerted on the sheath (2) to withdraw it.

4. A protective endpiece according to claim 3, wherein the detachable ring (10) presents an inside diameter which is slightly smaller than the inside diameter of the sheath (2), the retaining shoulder (19) of the detachable ring (10) being provided at the junction between said ring and the sheath (2).

5. A protective endpiece according to claim 1, wherein the body (11) of the detachable ring (10) presents an outside surface that is frustoconical.

\* \* \* \* \*